US006788242B2

(12) United States Patent
Pruitt

(10) Patent No.: US 6,788,242 B2
(45) Date of Patent: Sep. 7, 2004

(54) METHOD AND APPARATUS FOR TRANSFERRING INFORMATION TO A REMOTE CONTROL

(75) Inventor: Ralph Pruitt, Parker, CO (US)

(73) Assignee: U.S. Electronics, LLC, Littleton, CO (US)

( * ) Notice: Subject to any disclaimer, the term of this patent is extended or adjusted under 35 U.S.C. 154(b) by 0 days.

(21) Appl. No.: 10/299,050

(22) Filed: Nov. 18, 2002

(65) Prior Publication Data

US 2004/0095267 A1 May 20, 2004

(51) Int. Cl.[7] .......................... G08C 19/12; H04L 17/02
(52) U.S. Cl. .................. 341/176; 348/734; 340/825.22; 725/86
(58) Field of Search ......................... 341/176; 348/734; 340/825.22, 825.69; 725/86, 87

(56) References Cited

U.S. PATENT DOCUMENTS 6,223,348 B1 4/2001 Hayes et al.
6,264,559 B1 * 7/2001 Lawrence et al. ............ 463/40
2001/0011953 A1 * 8/2001 Shintani et al. ........ 340/825.22
2003/0066080 A1 * 4/2003 Kamieniecki ................ 725/80
2003/0107684 A1 * 6/2003 Chang et al. ............... 348/734
2003/0110502 A1 * 6/2003 Creed et al. .................. 725/86

OTHER PUBLICATIONS

"Button Overview," Dallas Semiconductor, pp. 1–3, 2002.
Datasheet for DS1996, Dallas Semiconductor, pp. 1–18, Sep. 10, 1999.

* cited by examiner

*Primary Examiner*—Timothy Edwards
(74) *Attorney, Agent, or Firm*—Swanson & Bratschun, LLC

(57) ABSTRACT

A method for transferring information to a remote control includes storing information in a transfer medium, inserting the transfer medium into a remote control that may or may not have already been programmed with information of the same type as that in the transfer medium, inputting the information from the transfer medium, and storing the information from the transfer medium in memory. Another embodiment of the method transfers information between remote controls. A remote control includes a processor, memory, and a transfer medium port. The processor is responsive to a data signal and the port is adapted to receive a transfer medium with information to be transferred to the remote control. The processor stores the information in memory. The remote control may also download information, which is to be transferred to other remote controls, into the transfer medium and the transfer medium may be reused to program additional remote controls.

34 Claims, 5 Drawing Sheets

METHOD AND APPARATUS FOR TRANSFERRING INFORMATION TO A REMOTE CONTROL

BACKGROUND OF THE INVENTION

1. Field of the Invention

The present invention generally relates to remote controls that are used to control various electronic devices, such as televisions, videocassette recorders (VCR), and digital video disc (DVD) players, and relates more particularly to a method and apparatus for transferring information to these remote controls.

2. Description of the Prior Art

Remote control users and cable companies are often required to upgrade or reprogram a large quantity of remote controls to enable these units to function properly in accordance with new programming requirements and assignments. Specifically, cable companies periodically need to reprogram remote controls that are issued to subscribers with new and/or updated programming information.

Due to the competitive nature of providing cable televised programming, the ability to upgrade remote controls as cheaply as possible without the need for remanufacturing each unit is imperative. Conventional methods of upgrading remote controls essentially transfer information from a primary source to each unit using wired or wireless interfaces, such as radio frequency (RF) or infrared (IR) links. However, these methods require the incorporation of costly receivers, and perhaps transmitters to provide handshaking ability and transfer validation, within each remote control unit.

OBJECTS AND SUMMARY OF THE INVENTION

It is an object of the present invention to provide a method and apparatus for transferring information to remote controls that are relatively inexpensive, immune to errors or failures, and do not require that the remote control be remanufactured.

It is another object of the present invention to provide a method and apparatus for transferring information to remote controls that utilizes transfer medium that may be reused to program a substantially limitless number of remote controls.

It is yet another object of the present invention to provide a method and apparatus for transferring information to remote controls that do not require expensive hardware or software to either load a transfer medium used to transfer the information from a primary source to the remote control or transfer the information from the transfer medium to memory resident within the remote control.

It is still another object of the present invention to provide a method and apparatus for transferring information to remote controls that are relatively straightforward to employ by an inexperienced technician in about fifteen (15) seconds per remote control or less.

It is an object of the present invention to provide a method and apparatus for transferring information from one remote control to another remote control that are relatively inexpensive, immune to errors or failures, and do not require that either remote control be remanufactured.

It is another object of the present invention to provide a method and apparatus that enable a remote control to exist in an unprogrammed or blank state and be readily initialized for operation merely by inserting a transfer medium.

A method of transferring information to at least one remote control formed in accordance with one form of the present invention, which incorporate some of the preferred features, includes the steps of storing information to be transferred in a transfer medium and inserting the transfer medium into a first remote control. The information stored in the transfer medium is input by the first remote control and stored into memory in the first remote control. The transfer medium may then be used to transfer information into additional remote controls.

A method of transferring information from a first remote control to at least one remote control formed in accordance with another form of the present invention, which incorporate some of the preferred features, includes the steps of inserting a transfer medium into the first remote control and outputting information to be transferred from the first remote control to the transfer medium. The information outputted from the first remote control is stored in the transfer medium and the transfer medium is removed from the first remote control. The transfer medium is inserted into a second remote control and the information stored in the transfer medium by the first remote control is inputted and stored into memory in the second remote control. The transfer medium may also be used to transfer information into additional remote controls.

A remote control formed in accordance with yet another form of the present invention, which incorporates some of the preferred features, includes a processor, memory, and a transfer medium port. The memory is coupled to the processor and the transfer medium port is coupled to a data signal. The processor is responsive to the data signal and the transfer medium port is adapted for receiving a transfer medium. The transfer medium is adapted for being stored with information to be transferred to the remote control and the processor inputs the information stored in the transfer medium. The processor stores the information read from the transfer medium into memory and the transfer medium may be used to program additional remote controls.

These and other objects, features, and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 1:
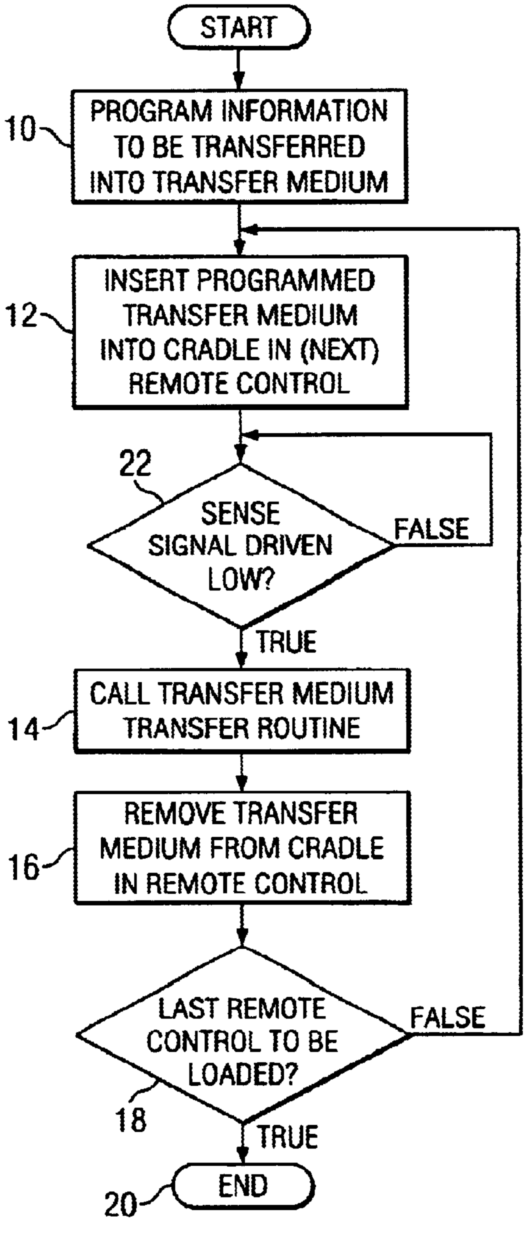
FIG. 1 is a flow chart showing a top level of operation for the method of transferring information to a remote control in accordance with the present invention.

The method and apparatus formed in accordance with the present invention essentially satisfy the need of users and cable companies to have a means for upgrading remote control devices without the necessity of remanufacturing each unit. The present invention allows information to be stored on a static transferable memory device, such as a disc-shaped iButton™, which is commercially available as, for instance, Part No. DS1996 from Dallas Semiconductor Corp., Sunnyvale, Calif. 94086, and then to transfer this information to volatile and/or non-volatile memory, such as electrically erasable programmable read only memory (EEPROM), Flash™ memory, or non-volatile random access memory (NVRAM) internal to the remote control. As a consequence, the invention provides a substantial improvement over conventional transfer mechanisms by allowing one master transfer medium to be programmed and subsequently used to repeatedly transfer information contained therein to as many remote control units as desired.

Information, such as infrared (IR) codes, macros, and key mappings, is preferably transferred to multiple remote control units via the iButton™ device or transfer medium. The transfer medium is preferably connected to three signals in the remote contrrol. The first signal is a data signal, which is preferably used to initially program data into the transfer medium, to subsequently transfer the programmed information from the transfer medium to the remote control, and as a communication path for commands to and from the transfer medium.

The second signal is preferably connected to ground. The third signal is preferably connected to a signal in the remote control that is automatically driven low when the transfer medium is inserted into the remote control. The remote control preferably senses a low on the third signal as an indication that the transfer medium is present in the remote control.

Thus, when the transfer medium is installed into a cradle or slot in the remote control, the remote control automatically senses its presence, wakes up, and initiates a read operation from the transfer medium. The read operation then preferably transfers the contents of the transfer medium to volatile and/or non-volatile memory resident in the remote control.

The remote control preferably indicates to the user that the transfer of information from the transfer medium to the remote control has successfully been completed by illuminating one or more light emitting diodes (LED) on the remote control. The user may than remove the transfer medium from the cradle and reuse the same transfer medium to program additional remote controls in a similar fashion.

When the information has been transferred from the transfer medium, the remote control preferably searches non-volatile memory in response to the selection of keys or the execution of macros, which ensures utilization of the transferred information. Thus, the remote control preferably uses the transferred information in future operations. Alternatively, the transferred information may be stored in the remote control pending another operation by the user, such as the selection of a key on the remote control, or stored as an alternative mode of operation subject to selection of a mode by the user.

It is also anticipated that the remote control device may or may not contain operable information prior to transferring information from the transfer medium as long as firmware within the remote control is resident in the remote control to enable the upload of information from the transfer medium. Thus, a remote control may be shipped to the user in an inoperable state and only be made operable after an initializing transfer operation in accordance with the present invention. The initializing transfer operation may require satisfaction of one or more predetermined conditions, such as payment of a fee and/or determination of the type of cable service to be assigned to a particular user.

The hardware and software required to both initially program information to be transferred into the transfer medium and to repeatedly load this information from the transfer medium device to multiple remote controls is preferably both minimal and inexpensive. For instance, a transfer medium programming device, which is used to initially download the information to be transferred into the transfer medium, costs about $15.00 and only one such device is preferably required.

An iButton™ device typically costs about $12.00 and again only one such unit is preferably required. The cost of hardware within each remote control to enable an upload of information from the transfer medium is about $0.12 per remote control, which is essentially the cost of two resistors and three springs. The method and apparatus formed in accordance with the present invention enables even an inexperienced technician to reprogram large quantities of remote controls in about fifteen (15) seconds per unit or less.

FIG. 1 is a high-level flow chart showing the operation of the method for transferring information to remote control devices in accordance with the present invention. The transfer medium is initially programmed in step 10 and inserted into a cradle in the remote control in step 12. If presence of the transfer medium is indicated by detecting that a sense signal has been driven low in step 22, the firmware in the remote control preferably calls a transfer medium transfer routine in step 14, which is able to transfer information from the transfer medium to memory resident in the remote control. If presence of the transfer medium is not sensed in step 22, the routine loops until the transfer medium has been sensed.

Upon completion of the transfer, the technician preferably removes the transfer medium from the remote control cradle in step 16 and, if there are additional remote controls to be loaded in step 18, the method returns to step 12 and the technician inserts the transfer medium into another next remote control to be programmed. If the last remote control has been programmed in step 18, the method preferably ends at step 20.

Figure 2:
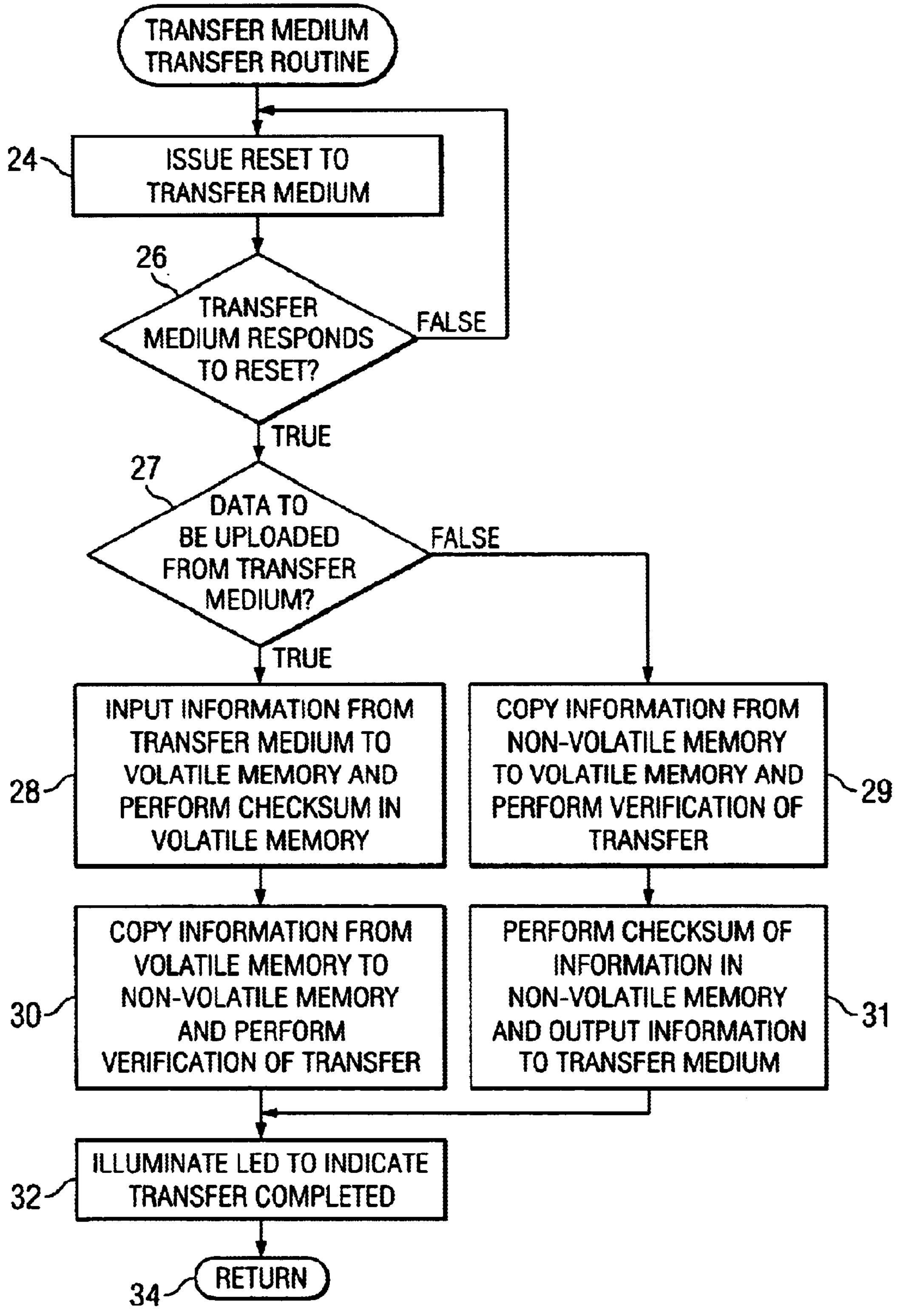
FIG. 2 is a flow chart showing a transfer medium transfer routine, which is called from the top level of operation shown in FIG. 1.

FIG. 2 is a flow chart that provides additional detail concerning the transfer medium transfer routine, which is preferably called from step 14 of FIG. 1. A reset is preferably issued to the transfer medium in step 24 and, if the transfer medium responds to the reset in step 26 by issuing, for instance, a presence pulse.

However, if the transfer medium does not respond to the reset in step 26, the routine preferably returns to issue another reset in step 24. It is then preferably determined whether the transfer medium transfer routine was called to upload information from the transfer medium in step 27. If so, information is preferably uploaded from the transfer medium to volatile memory and the uploaded information is verified by, for instance, performing a checksum of the uploaded information in volatile memory, in step 28.

The information in volatile memory is then preferably copied to non-volatile memory and the copied information is verified in non-volatile memory, such as by performing a byte-by-byte comparison between volatile and non-volatile memory in step 30. If either of the verifications of information in steps 28 and 30 are unsuccessful, the routine preferably halts and provides an indication to the user, such as by illuminating one or more LED.

An LED is preferably illuminated in step 32 to indicate the successful completion of the transfer and the routine returns from its call in step 34. Further information concerning operation of the iButton™ device is provided in a datasheet entitled "DS1996 64kbit Memory iButton™, which is available from Dallas Semiconductor Corporation and incorporated herein by reference.

Figure 3A:
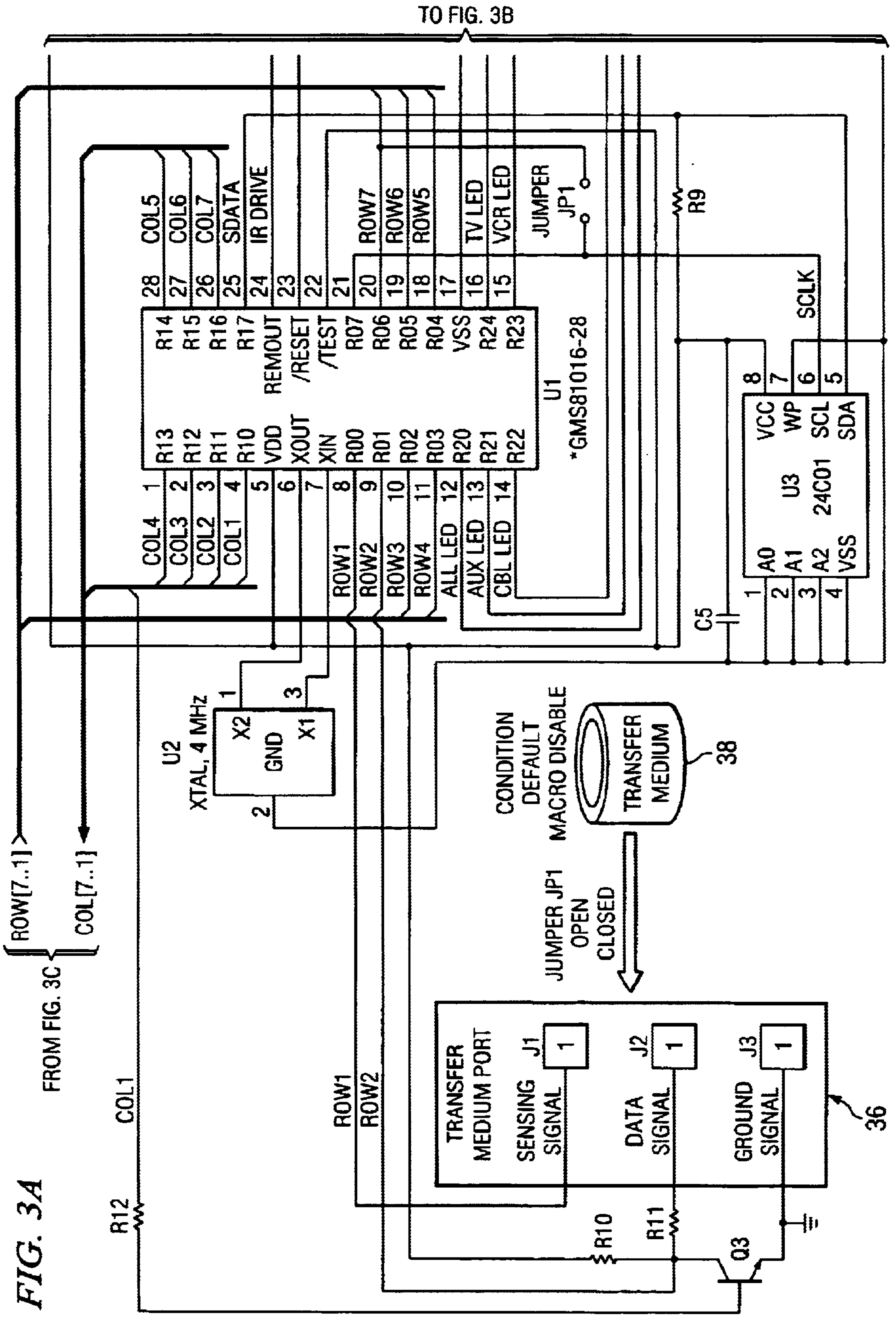
FIGS. 3A, 3B and 3C are schematic diagrams of one embodiment of a remote control formed in accordance with the present invention.
Figure 3B:
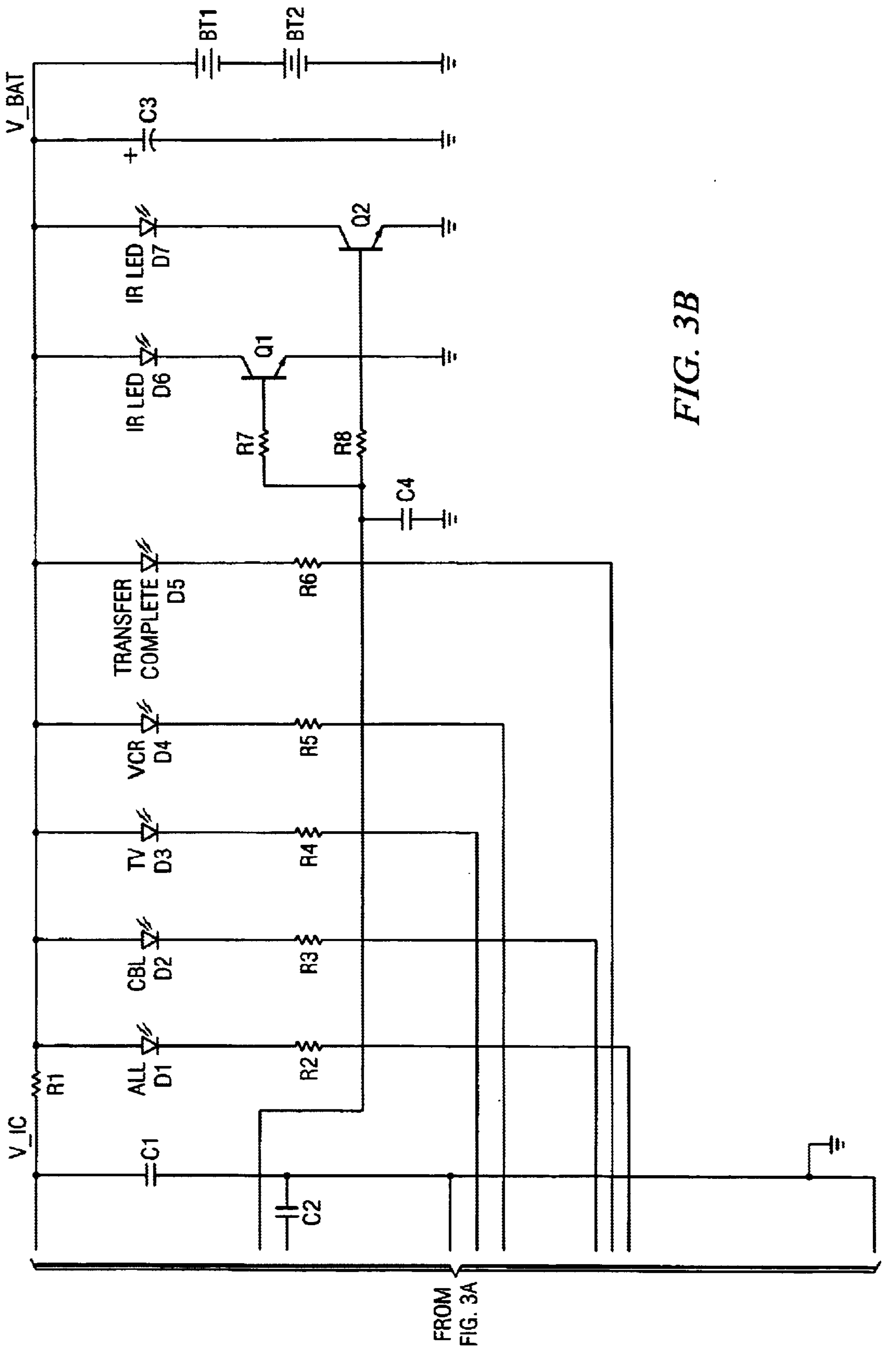

FIGS. 3A and 3B are schematic diagrams of a remote control formed in accordance with the present invention, which includes a microcontroller U1 that is preferably coupled to an external crystal oscillator U2 operating at 4 MHz. The remote control also preferably includes a serial EEPROM U3, which is non-volatile memory that is used to store information transferred from the transfer medium.

Various LED D1–D5 are preferably used to indicate the status of the remote control to the user or technician, such as whether a command relates to a television, VCR, or cable, as well as the successful completion of a transfer from the transfer medium, which is preferably indicated by LED D5, or an error in verifying transferred information. These conditions may also be indicated by implementing forward and/or reverse chase sequences in LED D1–D5 or any other sequence that is preferably not encountered under normal operating conditions. Infrared LED D6 and D7 are preferably used to transmit wireless infrared information to the electronic device to be controlled.

A transfer medium port or cradle 36 preferably includes physical connectors for interfacing between the remote control and the transfer medium 38 inserted into the cradle 36. Connector J1 of the cradle 36 preferably couples a sensing signal, which indicates whether the transfer medium is in the cradle 36, to the microcontroller U1. Connector J3 of the cradle 36 is preferably connected to ground and provides a ground signal to the outer casing of the transfer medium 38 when inserted into the cradle 36.

The outer casing of the transfer medium 38 preferably provides a connection between ground on connector J3 and the sensing signal on connector J1, which enables the remote control to automatically sense the presence of the transfer medium 38 by detecting that the sensing signal has been driven low. Connector J2 is preferably connected to a data signal, which provides a data path from a contact on the transfer medium 38 to and from the microcontroller U1 in the remote control. Three springs (not shown) are preferably used to maintain electrical contact between the connectors J1, J2, and J3 and the transfer medium 38 shown in FIG. 3A.

A resistor R10 is preferably coupled to the data signal and used as a pullup resistor to a supply voltage. A resistor R11 is electrically coupled in series with the data signal between the connector J2 and an input/output port of the microcontroller U1 and is preferably used as a filtering resistor in accordance with recommended design practices concerning the DS 1996.

A resistor R12 and a transistor Q3 preferably provide an open collector configuration to enable the data signal coupled to connector J2 to be driven low by either the microcontroller U1 or the transfer medium 38 as a means of communicating commands and data during the transfer of information. The resistor R12 is electrically coupled in series between the base of transistor Q3 and an input/output port of the microcontroller U1. The collector of transistor Q3 is preferably coupled to the input/output port used for the data signal, and the emitter of transistor Q3 is preferably coupled to ground.

Figure 3C:
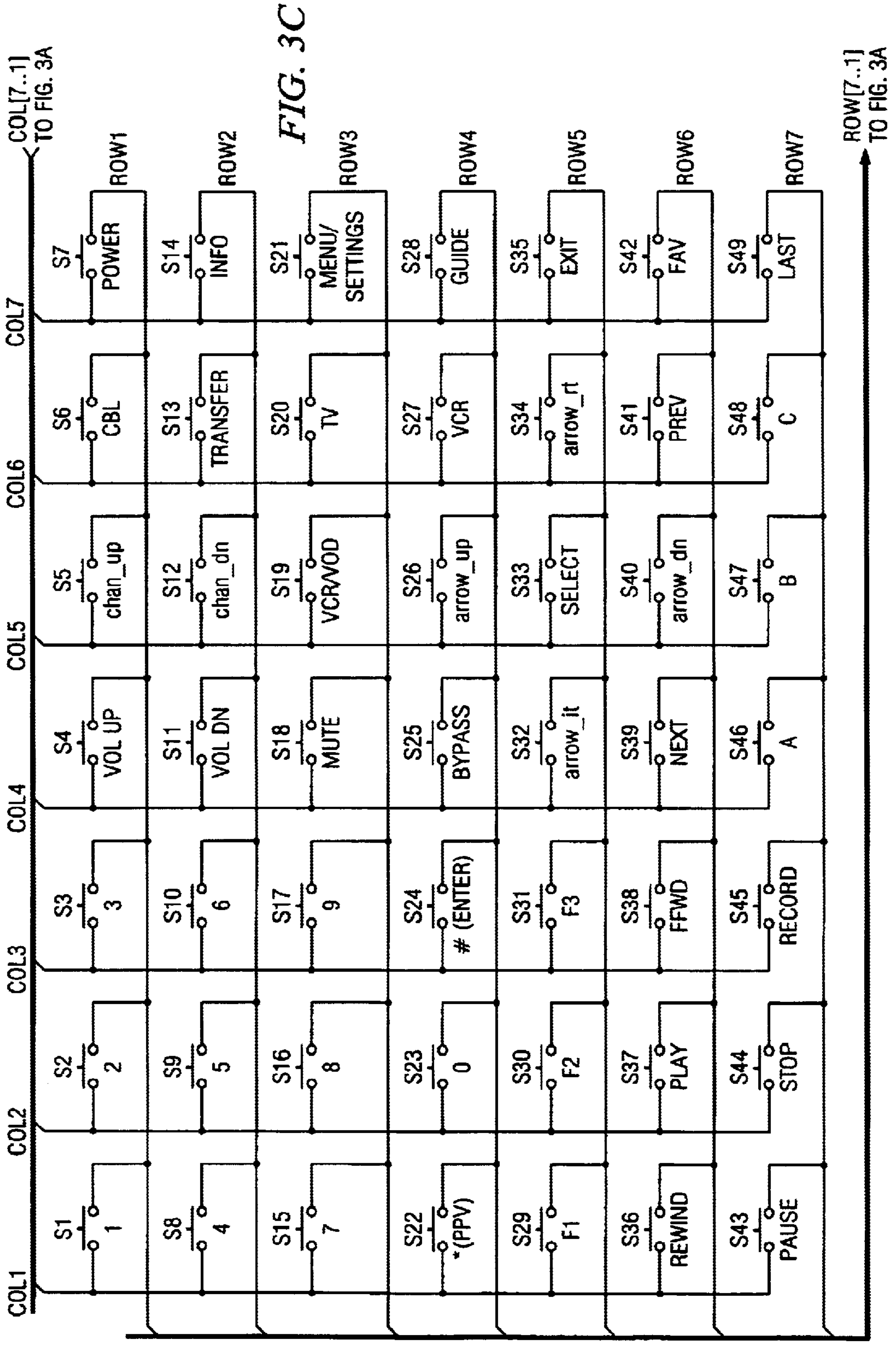

FIG. 3C shows a switch matrix that represents the switches or keys located on the remote control and their interconnection with signals on the microcontroller U1. Each of the switches is connected to row and column signals, which are then coupled to the microcontroller U1 shown in FIGS. 3A and 3B. The microcontroller U1 determines the identity of a selected switch by manipulating and inputting the row and column signals.

Figure 4:
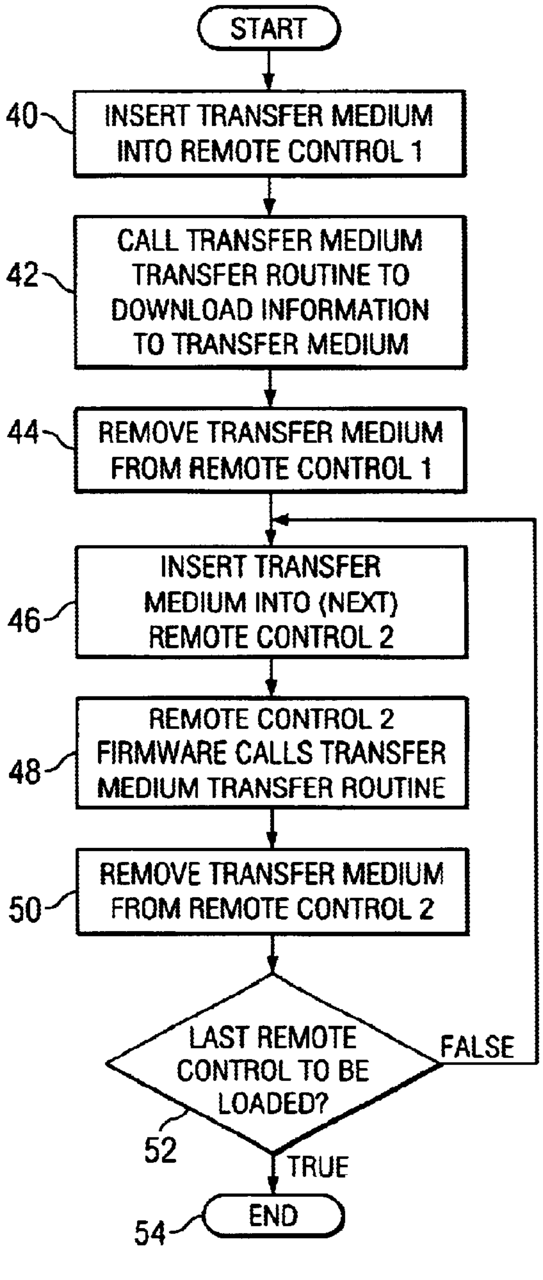
FIG. 4 is a flow chart showing a top level of operation for a method of transferring information from one remote control to another in accordance with the present invention.

FIG. 4 is a flow chart showing a second embodiment of the method in accordance with the present invention, in which information is transferred from one remote control to another remote control. The transfer medium is preferably inserted into a first remote control in step 40 and the transfer information is downloaded from the first remote control to the transfer medium by calling the transfer medium transfer routine in step 42.

If it is determined that the transfer medium transfer routine was called to download information to the transfer medium in step 27 of FIG. 2, the information in non-volatile memory to be downloaded is preferably copied to volatile memory and the transfer is verified by, for instance, performing a byte-by-byte comparison between non-volatile and volatile memory in step 29. The transferred information in volatile memory is then preferably verified by, for instance, performing a checksum and output to the transfer medium in step 31. If either of the verifications of information in steps 29 and 31 are unsuccessful, the routine preferably halts and provides an indication to the user, such as by illuminating one or more LED. One or more different LED or different sequences of LED are preferably illuminated in step 32 to indicate that the transfer has been successfully completed. A return from the transfer medium transfer routine is then executed in step 34.

As shown in FIG. 4, the programmed transfer medium is then preferably removed from the first remote control in step 44 and inserted into a second remote control in step 46, as shown in FIG. 4. Firmware within the second remote control preferably calls the transfer medium transfer routine in step 48. As shown in FIG. 2, if it is determined that the transfer medium transfer routine was called to upload data from the transfer medium in step 27, then steps 28, 30, and 32 are preferably executed and the routine returns in step 34.

As shown in FIG. 4, the transfer medium is preferably removed from the second remote control in step 50 and, if it is determined that this is the last remote control to be programmed in step 52, the method ends at step 54. However, if it is determined that additional remote controls are to be programmed using the same transfer medium in step 52, the method preferably returns to step 46.

The present invention may also be used to transfer information from a transfer medium to a remote control to enable that remote control to be used for the first time. That is, the method in accordance with the present invention enables a remote control that was not already programmed with information of the type found in the transfer medium to exist in a blank or unprogrammed state, which may readily be initialized for operation by merely inserting a transfer medium.

To facilitate this embodiment, a bootstrap loading routine is preferably resident in non-volatile memory within the remote control, which remains dormant until a transfer medium is inserted into the cradle. The microcontroller wakes up in response to inserting the transfer medium. The bootstrap loading routine, the operation of which is substantially similar to that shown in FIG. 1, preferably calls the transfer medium transfer routine, as shown in FIG. 2, to upload information from the transfer medium to volatile memory and then non-volatile memory in the remote control. Once the information has been successfully uploaded from the transfer medium, the remote control is preferably able to commence normal operation.

Thus, the method and apparatus in accordance with the present invention for transferring information to and between remote controls is relatively inexpensive, immune to errors or failures, does not require that the remote control be remanufactured, and enables the reuse of a single transfer medium to program a substantially limitless number of remote controls. In addition, the method and apparatus do not require expensive hardware or software to either load the transfer medium used to transfer the information from a primary source to the remote control or transfer the information from the transfer medium to memory resident within the remote control. Further, the method and apparatus are relatively straightforward to employ by an inexperienced technician in about fifteen (15) seconds per remote control or less. In addition, the method and apparatus enable the remote control to exist in an unprogrammed state, which may readily be initialized for operation by merely inserting a transfer medium.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method of transferring information to at least one remote control, the method comprising the steps of:

storing information to be transferred in a transfer medium, the transfer medium having only two interface terminals;

inserting the transfer medium into a first remote control;

contacting a first of the two terminals of the transfer medium with a data terminal of the first remote control;

contacting a second of the two terminals of the transfer medium with a reference terminal of the first remote control;

inputting the information stored in the transfer medium through the first terminal to the first remote control; and storing the information input from the transfer medium into memory in the first remote control.

2. A method of transferring information to at least one remote control as defined by claim 1, wherein the transfer medium includes an iButton™ device.

3. A method of transferring information to at least one remote control as defined by claim 1, wherein the information to be transferred includes at least one of an infrared (IR) code, macro, and key mapping.

4. A method of transferring information to at least one remote control as defined by claim 1, wherein the memory in at least one remote control includes at least one of volatile memory and non-volatile memory.

5. A method of transferring information to at least one remote control as defined by claim 1, the method further comprising the step of indicating that the information was successfully transferred from the transfer medium to the at least one remote control.

6. A method of transferring information to at least one remote control as defined by claim 1, the method further comprising the steps of:

removing the transfer medium from the first remote control;

inserting the transfer medium into a second remote control;

contacting a first of the two terminals of the transfer medium with a data terminal of the second remote control;

contacting a second of the two terminals of the transfer medium with a reference terminal of the second remote control;

inputting the information stored in the transfer medium through the first terminal to the second remote control; and storing the information input from the transfer medium into memory in the second remote control.

7. A method of transferring information to at least one remote control as defined by claim 1, the method further comprising the step of verifying the information input from the transfer medium to the first remote control.

8. A method of transferring information to at least one remote control as defined by claim 1, the method further comprising the step of coupling a sensing terminal of the first remote control with the reference terminal of the first remote control through the second terminal of the transfer medium whereby the presence of the transfer medium in the first remote control is detectable.

9. A method of transferring information to at least one remote control as defined by claim 8, the method further comprising the step of generating a reset signal from the first remote control to the transfer medium in response to detecting the presence of the transfer medium.

10. A method of transferring information to at least one remote control as defined by claim 9, the method further comprising the step of determining whether the transfer medium has responded to the reset signal, the step of inputting information from the transfer medium being performed in response to the transfer medium responding to the reset signal.

11. A method of transferring information from a first remote control to at least a second remote control, the method comprising the steps of:

inserting a transfer medium into the first remote control, the transfer medium having only two interface terminals;

contacting a first of the two terminals of the transfer medium with a data terminal of the first remote control;

contacting a second of the two terminals of the transfer medium with a reference terminal of the first remote control;

outputting information to be transferred from the first remote control through the first terminal to the transfer medium;

storing the information outputted from the first remote control in the transfer medium;

removing the transfer medium from the first remote control;

inserting the transfer medium into a second remote control;

contacting the first terminal of the transfer medium with a data terminal of the second remote control;

contacting the second terminal of the transfer medium with a reference terminal of the second remote control;

inputting the information stored in the transfer medium through the first terminal to the second remote control; and storing the information input from the transfer medium into memory in the second remote control.

12. A method of transferring information from a first remote control to at least one remote control as defined by claim 11, wherein the transfer medium includes an iButton™ device.

13. A method of transferring information from a first remote control to at least one remote control as defined by claim 11, wherein the information to be transferred includes at least one of an infrared (IR) code, macro, and key mapping.

14. A method of transferring information from a first remote control to at least one remote control as defined by claim 11, wherein the memory in at least one of the first remote control and the second remote control includes at least one of volatile and non-volatile memory.

15. A method of transferring information from a first remote control to at least one remote control as defined by claim 11, the method further comprising the step of indicating that the information was successfully transferred from the first remote control to the transfer medium.

16. A method of transferring information from a first remote control to at least one remote control as defined by claim 11, the method further comprising the step of indicating that the information was successfully transferred from the transfer medium to the second remote control.

17. A method of transferring information from a first remote control to at least one remote control as defined by claim 11, the method further comprising the steps of:

removing the transfer medium from the second remote control;

inserting the transfer medium into a third remote control;

contacting a first of the two terminals of the transfer medium with a data terminal of the third remote control;

contacting a second of the two terminals of the transfer medium with a reference terminal of the third remote control;

inputting the information stored in the transfer medium through the first terminal to the third remote control; and storing the information input from the transfer medium into memory in the third remote control.

18. A method of transferring information from a first remote control to at least one remote control as defined by claim 11, the method further comprising the step of verifying the information input from the transfer medium by the second remote control.

19. A method of transferring information from a first remote control to at least one remote control as defined by claim 11, the method further comprising the step of coupling a sensing terminal of the first remote control with the reference terminal of the first remote control through the second terminal of the transfer medium whereby the presence of the transfer medium in at least one of the remote controls is detectable.

20. A method of transferring information from a first remote control to at least one remote control as defined by claim 19, the method further comprising the step of generating a reset signal to the transfer medium in response to detecting the presence of the transfer medium.

21. A method of transferring information from a first remote control to at least one remote control as defined by claim 20, the method further comprising the step of determining whether the transfer medium has responded to the reset signal, the step of inputting information from the transfer medium being performed in response to the transfer medium responding to the reset signal.

22. A remote control, which comprises:

a transfer medium port adapted to receive a removable transfer medium having only two terminals, the transfer medium port comprising a data terminal for contacting a first terminal of the transfer medium and a reference terminal for contacting a second terminal of the transfer medium;

a memory;

a processor coupled to the memory and to the data terminal and operable to transfer information stored in the transfer medium to the memory.

23. A remote control as defined by claim 22, wherein the transfer medium includes an iButton™ device.

24. A remote control as defined by claim 22, wherein the information to be transferred includes at least one of an infrared (IR) code, macro, and key mapping.

25. A remote control as defined by claim 22, wherein the memory includes at least one of volatile memory and non-volatile memory.

26. A remote control as defined by claim 22, the remote control further comprising at least one indicator, the at least one indicator indicating that the information was successfully transferred from the transfer medium to the memory.

27. A remote control as defined by claim 22, the remote control further comprising an open collector circuit, the open collector circuit coupling the processor to the data signal.

28. A remote control as defined by claim 22, the open collector circuit being adapted for enabling at least one of the processor and the transfer medium to control the data signal.

29. A remote control as defined by claim 22, wherein the processor is adapted for verifying the information inputted from the transfer medium.

30. A remote control as defined by claim 22, wherein the transfer medium port further comprises a sensing terminal adapted to conduct a sensing signal to the Processor in response to the transfer medium being received by the transfer medium port to indicate a presence of the transfer medium in the transfer medium port, the processor being responsive to the sensing signal.

31. A remote control as defined by claim 30, wherein the sensing signal is coupled to the reference signal through the second terminal of the transfer medium in response to the transfer medium being received by the transfer medium port.

32. A remote control as defined by claim 30, wherein the reference signal is coupled to ground.

33. A remote control as defined by claim 30, wherein the processor generates a reset signal to the data terminal in response to detecting the presence of the transfer medium.

34. A remote control as defined by claim 33, the processor further adapted to whether the transfer medium has responded to the reset signal, the processor inputting information from the transfer medium in response to the transfer medium responding to the reset signal.

* * * * *